(12) United States Patent
Sakai

(10) Patent No.: US 7,177,746 B2
(45) Date of Patent: Feb. 13, 2007

(54) OCCUPANT-CLASSIFYING SYSTEM

(75) Inventor: Morio Sakai, Toyota (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 151 days.

(21) Appl. No.: 11/085,194

(22) Filed: Mar. 22, 2005

(65) Prior Publication Data
US 2005/0216158 A1    Sep. 29, 2005

(30) Foreign Application Priority Data
Mar. 23, 2004 (JP) ............................. 2004-084140
Mar. 23, 2004 (JP) ............................. 2004-084141

(51) Int. Cl.
*G06F 19/00* (2006.01)
*B60R 21/32* (2006.01)

(52) U.S. Cl. ..................... 701/45; 280/735; 280/801.1; 180/273

(58) Field of Classification Search ............ 701/45–47; 280/735, 802, 801.1; 180/271, 273
See application file for complete search history.

(56) References Cited

U.S. PATENT DOCUMENTS

| | | | |
|---|---|---|---|
| 6,012,007 A | * | 1/2000 | Fortune et al. ............... 701/45 |
| 7,050,897 B2 | * | 5/2006 | Breed et al. .................. 701/46 |
| 7,065,438 B2 | * | 6/2006 | Thompson et al. ........... 701/45 |
| 2002/0059022 A1 | * | 5/2002 | Breed et al. .................. 701/45 |
| 2002/0125051 A1 | * | 9/2002 | Aoki ........................... 177/144 |
| 2004/0032118 A1 | * | 2/2004 | Kojima et al. ............... 280/735 |
| 2004/0068357 A1 | * | 4/2004 | Kiribayashi .................. 701/45 |
| 2004/0183284 A1 | * | 9/2004 | Jitsui et al. ............... 280/730.1 |

FOREIGN PATENT DOCUMENTS

| | | |
|---|---|---|
| JP | 203276557 | 10/2003 |
| JP | 2003276557 A | 10/2003 |
| JP | 2004-34918 | 2/2004 |
| JP | 2004034918 | 2/2004 |
| WO | WO 01/85497 A1 | 11/2001 |

* cited by examiner

*Primary Examiner*—Gary Chin
(74) *Attorney, Agent, or Firm*—Sughrue Mion, PLLC

(57) ABSTRACT

An occupant-classifying system includes a load-detecting device assembled at a vehicle seat for detecting a load value imposed on the vehicle seat and for outputting the load value, and a controller for determining whether the vehicle seat is in an occupied state, or in an unoccupied state on a basis of the load value outputted from the load-detecting device. A seat occupied state is classified into plural modes defined on a basis of plural threshold load values. The controller is configured to determine the seat occupied state when the load value falls within a specific mode among the plural modes and lasts for a predetermined time duration defined for each specific mode. The controller changes one of the threshold load values which define a boundary between the selected mode and another, neighboring mode, whether occupied mode or unoccupied mode.

9 Claims, 6 Drawing Sheets

OCCUPANT-CLASSIFYING SYSTEM

CROSS REFERENCE TO RELATED APPLICATIONS

This application is based on and claims priority under 35 U.S.C. §119 with respect to Japanese Patent Application No. 2004-084141 filed on Mar. 23, 2004 and Japanese Patent Application No. 2004-084140 filed on Mar. 23, 2004, the entire content of which are incorporated herein by reference.

FIELD OF THE INVENTION

The present invention relates to an occupant-classifying system. More particularly, the present invention pertains to an occupant-classifying system for judging, on the basis of output from a sensor that detects a load imposed on a vehicle seat, whether or not an occupant is occupying the seat.

BACKGROUND

Airbags are one example of equipment in a vehicle that improves safety when vehicles collide. Some airbags are inflated from the front of a seat, and some airbags are inflated from the side of a seat. With control of the deployment of airbags, deployment speed can be adjusted, and on occasions operation is inhibited, in accordance with judgment as to whether an occupant of a seat is an adult or a child. In order to ensure safety, it is essential to judge accurately whether the occupant of the seat is an adult or a child.

A known occupant-classifying system described in JP2003-276557A includes a sensor for detecting a load imposed on a surface on which an occupant may sit, and, on the basis of the load detected by the sensor, judges whether an occupant of a seat is an adult or a child.

However, the construction of the known occupant-classifying system described in JP2003-276557A does not take into account the movement and change of posture of an occupant while she or he is seated. For example, when an adult occupies a seat and the occupant changes his or her posture, the load imposed on the seat may be reduced as a result of the change in posture, and even when an adult has been occupying a seat, erroneous judgment have been made to the effect that a child is occupying the seat.

In order to overcome the foregoing drawbacks, for example, JP2004-34918 describes an occupant-classifying system which reduces the degree of erroneous judgment of classification of the occupant, by defining threshold load value used for judging change from an adult occupied state to a child occupied state and threshold load value used for judging change from a child occupied state to an adult occupied state different from one another. However, for example, in case of an adult of a light weight occupies a seat and adopts a posture that merely appears to reduce the weight, there is a possibility of erroneous judgment to the effect that a child is occupying the seat. Further, with the construction described in JP2004-34918, once it is judged that the seat is occupied by a child, in case that the threshold load value used for judging change from an adult occupied state to a child occupied state is determined large so that the judgment is unlikely to be switched from a status where a seat is occupied by a child to a status where a seat is occupied by an adult, the erroneous judgment is maintained and there is possibility that judgment cannot be restored.

Further, the construction of the occupant-classifying system described in JP2003-276557 does not take into account the posture change of an occupant while seated, and it is not suggested therein that the degree and frequency of changes of posture of an occupant are influenced by whether or not the occupant is wearing a seatbelt. In general, when an occupant does not wear a seatbelt, the occupant can change posture freely, and the occupant can adopt a posture which largely changes the detectible load, for example, by leaning against a console. Further, because a body of the occupant is free, the occupant probably changes posture frequently. On the other hand, when an occupant wears a seatbelt, a load imposed on the seat is unlikely to fluctuate significantly because the body of an occupant is confined and a change in posture is limited. Further, frequency with which an occupant changes posture is relatively limited. Thus, when a judgment is made using the same threshold load value, irrespective of whether an occupant wears a seatbelt or not, an erroneous judgment is likely to be made because of changes in posture that influence a load when the occupant does not wear the seatbelt. Further, because an occupant changes posture frequently when not wearing a seatbelt, the number of erroneous judgments may be increased, and thus changes of judgment may be increased. On the other hand, when an occupant wears a seatbelt, there is a drawback that a load is unlikely to fluctuate because changes in posture are restricted, and once the erroneous judgment has been made the erroneous judgment becomes implanted.

A need thus exists for an occupant-classifying system which prevents erroneous judgment with accuracy, and facilitates an accurate judge classification of a person occupying a seat.

SUMMARY OF THE INVENTION

In light of the foregoing, the present invention provides an occupant-classifying system, which includes a load-detecting means assembled at a vehicle seat for detecting a load value imposed on the vehicle seat and for outputting the load value, and a controller for determining whether the vehicle seat is in an occupied state, or in an unoccupied state on a basis of the load value outputted from the load-detecting means. A seat occupied state is classified into plural modes defined on a basis of plural threshold load values. The controller is configured to determine the seat occupied state when the load value falls within a specific mode among the plural modes and lasts for predetermined time duration defined for each specific mode. The controller changes one of the threshold load values which define a boundary between the selected mode and another, neighboring mode, whether occupied mode or unoccupied mode.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be explained with reference to illustrations of drawing figures as follows.

Figure 1:
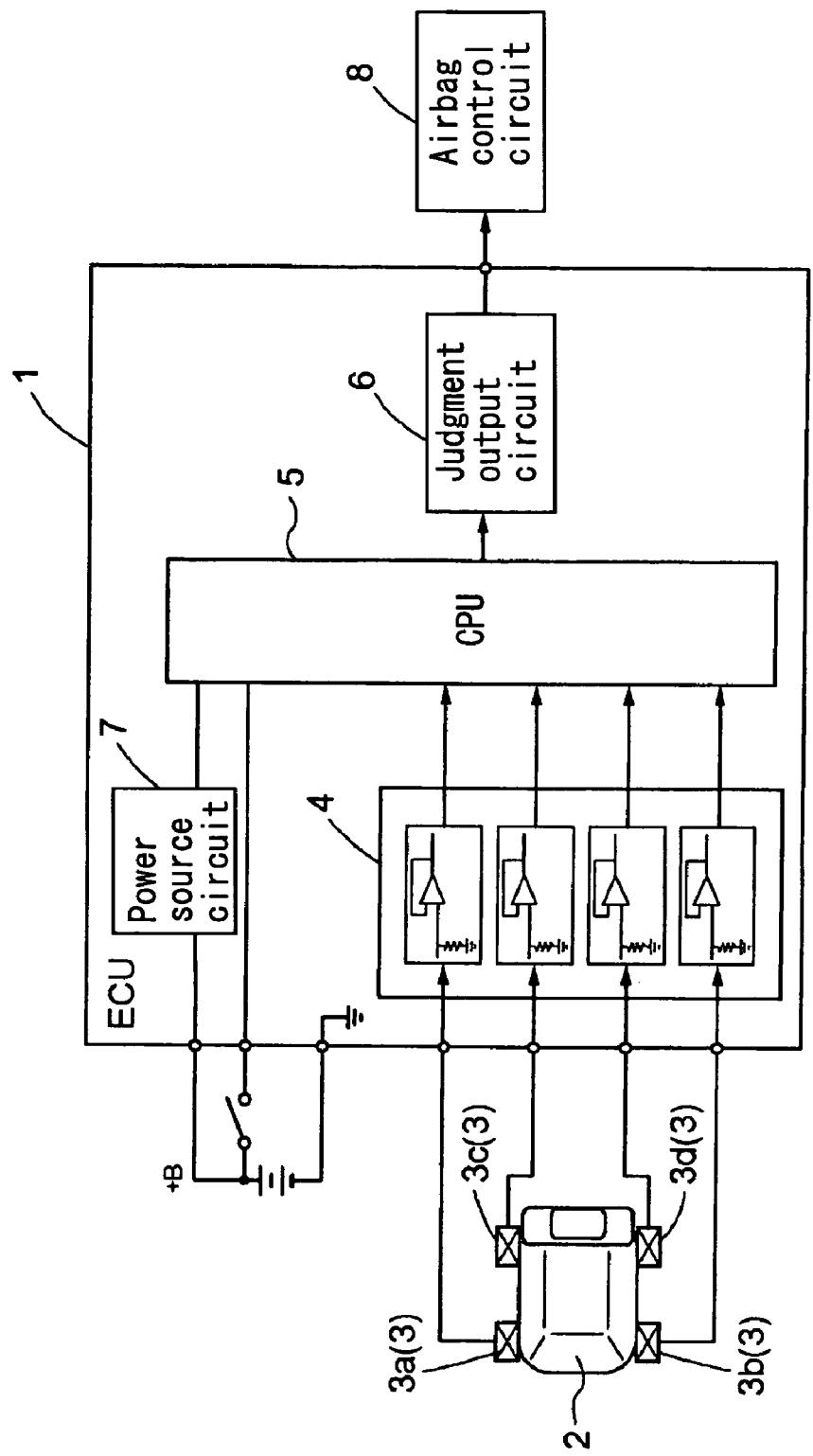
FIG. 1 is an occupant-classifying system and a structural view surrounding thereof according to a first embodiment of the present invention.

As shown in FIG. 1, an occupant-classifying system is constructed in an ECU (Electronic Control Unit) 1 for receiving load data from a sensor 3 (i.e., load detecting means) which detects a load imposed on a seat 2 for vehicle, and for outputting judgment result to an airbag control circuit 8. The sensor 3 is provided at least at four positions at the right and the left of the front portion, and the right and the left of the rear portion of the seat 2 for outputting the load data in the form of electric voltage.

The ECU 1 includes a sensor signal inputting circuit 4, a CPU (Central Processing Unit) 5, a judgment output circuit 6, and a power source circuit 7. The sensor signal inputting circuit 4 is connected to the sensor 3 and the CPU 5 for receiving the load data from the sensor 3 in the form of the electric voltage, converting analog signal to digital signal, and outputting the signal to the CPU 5. The sensor signal inputting circuit 4 is provided for each sensor 3. According to the embodiment of the present invention, four sensor signal inputting circuits 4 are provided for sensors 3a–3d respectively. On the basis of load data received from the sensor signal inputting circuit 4, the CPU 5 judges which classifications of load imposed on the seat 2 corresponds to an unoccupied state at which an occupant does not occupy a seat, and to a seat occupied state at which an occupant does occupy a seat. In this case, the occupied state is classified into plural occupied states on the basis of predetermined threshold load values. According to the first embodiment of the present invention, the seat occupied state includes a child occupied state at which a child is occupying a seat and an adult occupied state at which an adult is occupying a seat.

In this case, the CPU 5 judges whether a seat occupied state is at an unoccupied state or an occupied state corresponding to the detected load using threshold load values and predetermined time durations. More particularly, when the load detected by the sensors 3a–3d corresponds to one of plural occupied states and that particular occupied state is maintained for a predetermined time durations predetermined for the particular occupied state when the occupant occupies a seat, it is judged that an occupant is sitting on a seat. Further, according to the first embodiment of the present invention, a switching flag is established indicating a change of the seat occupied state. The switching flag is set when a possibility that an occupant of the seat 2 is an adult is high, and the switching flag is cleared when the seat occupied state is changed from a child occupied state to an adult occupied state and a possibility that an occupant of the seat 2 is a child is high.

Determination of the threshold load value and predetermined time durations will be explained as follows.

A threshold load value A (i.e., a first threshold load value) is established as a threshold load value when a seat occupied state is changed from either an unoccupied state, or a child occupied state, to an adult occupied state. A threshold load value C (i.e., a second threshold load value) is established as a threshold load value when a seat occupied state is changed from an unoccupied state to a child occupied state and when a seat occupied state is changed from an adult occupied state, or a child occupied state, to an unoccupied state. The threshold load value C corresponds to a prescribed maximum load for a child. In this case, first predetermined time duration T1 is determined for a change to an adult occupied state, second predetermined time duration T2 is determined for a change to a child occupied state, and third predetermined time duration T3 is determined for a change to an unoccupied state.

When a seat occupied state is changed from an adult occupied state to a child occupied state, predetermined threshold load value and predetermined time duration are selected on the basis of switching flag. When the switching flag is set, lower third threshold load value X (i.e., serving as a first state change load value) is determined and predetermined time duration TX which is longer than the second predetermined time duration T2, is determined. Thus, a seat occupied state is unlikely to be changed from an adult occupied state to a child occupied state, and an erroneous judgment is prevented. In cases where the switching flag has been cleared, fourth threshold load value Y (i.e., a second state change load value) which is greater than the third threshold load value X is determined, and predetermined time duration TY shorter than the second predetermined time duration T2 is determined. Accordingly, a seat occupied state becomes easily changed from an adult occupied state to a child occupied state, and judgment is restored easily to a child occupied state.

Figure 2:
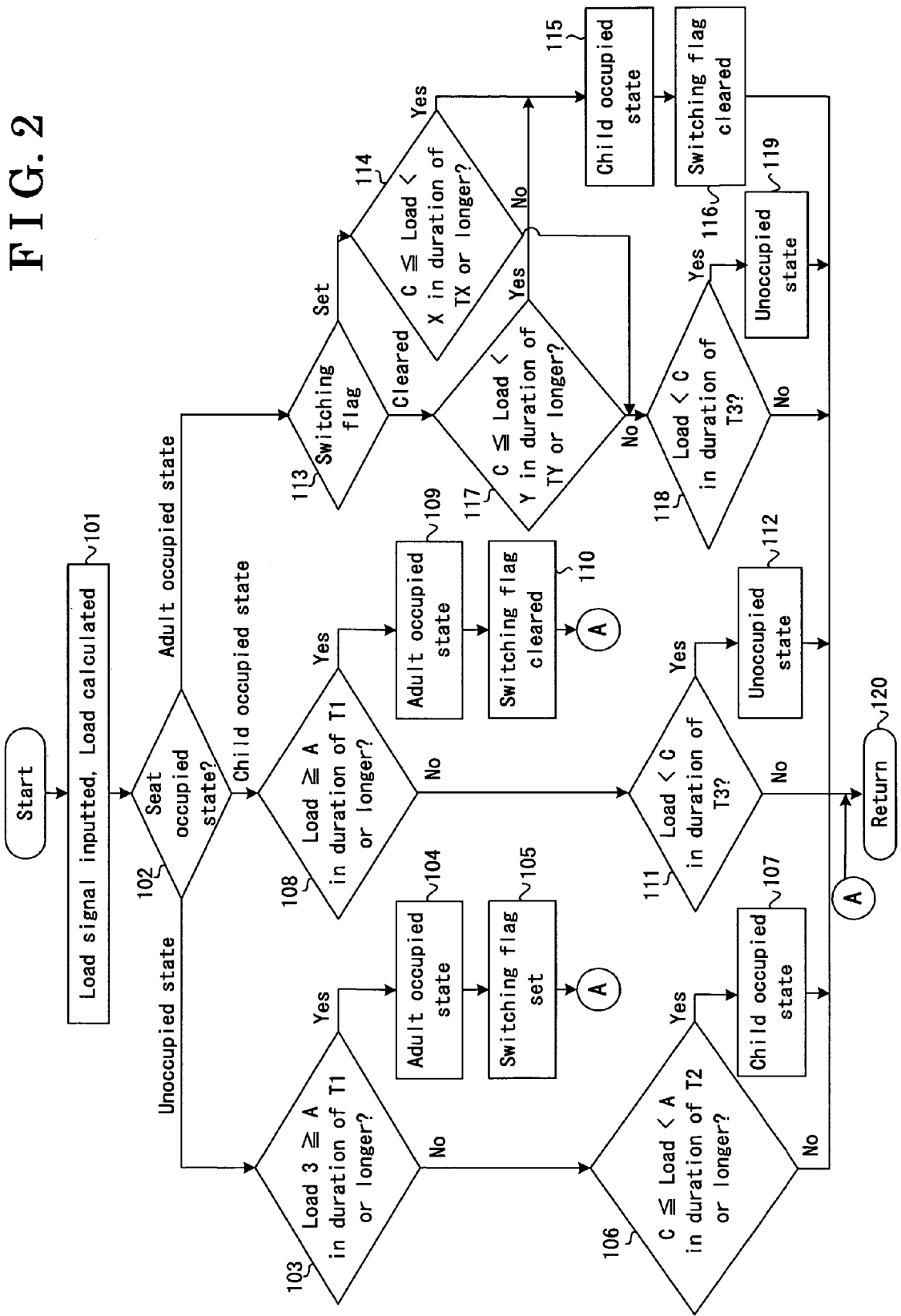
FIG. 2 is a view showing a flow of the occupant-classifying system according to the first embodiment of the present invention.
Figure 3:
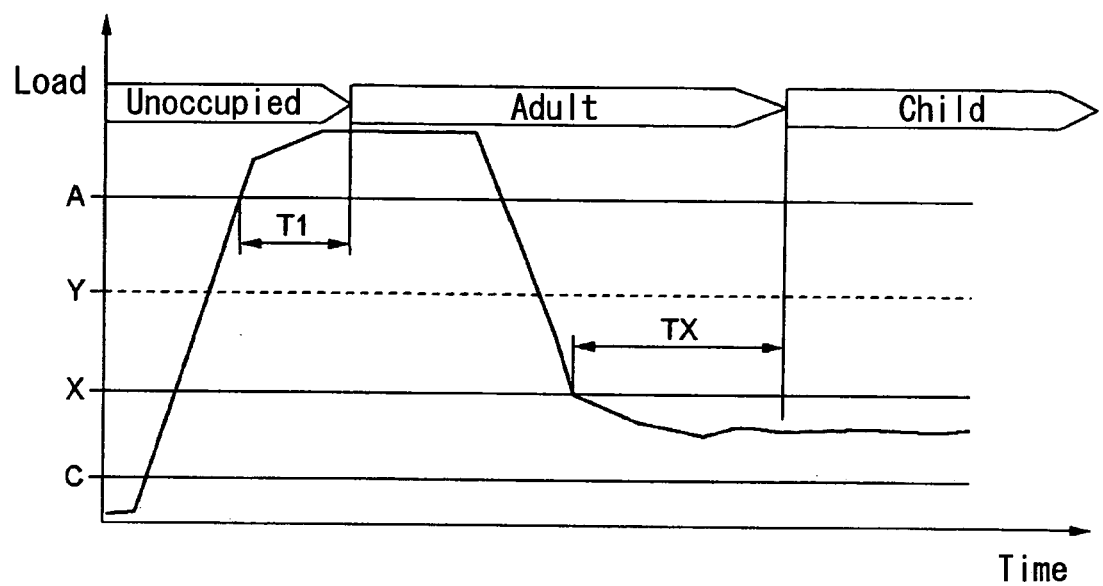
FIG. 3 is a view showing a relationship between a load fluctuation and a judgment of the occupant-classifying system according to the first embodiment of the present invention.
Figure 4:
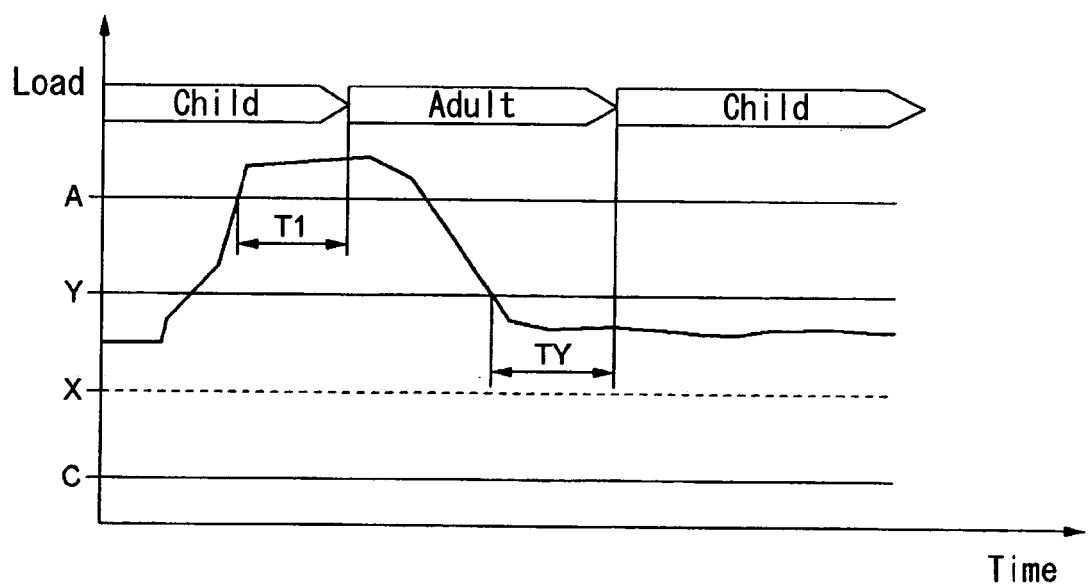
FIG. 4 is a view showing a relationship between a load fluctuation and a judgment of the occupant-classifying system according to the first embodiment of the present invention.
Figure 5:
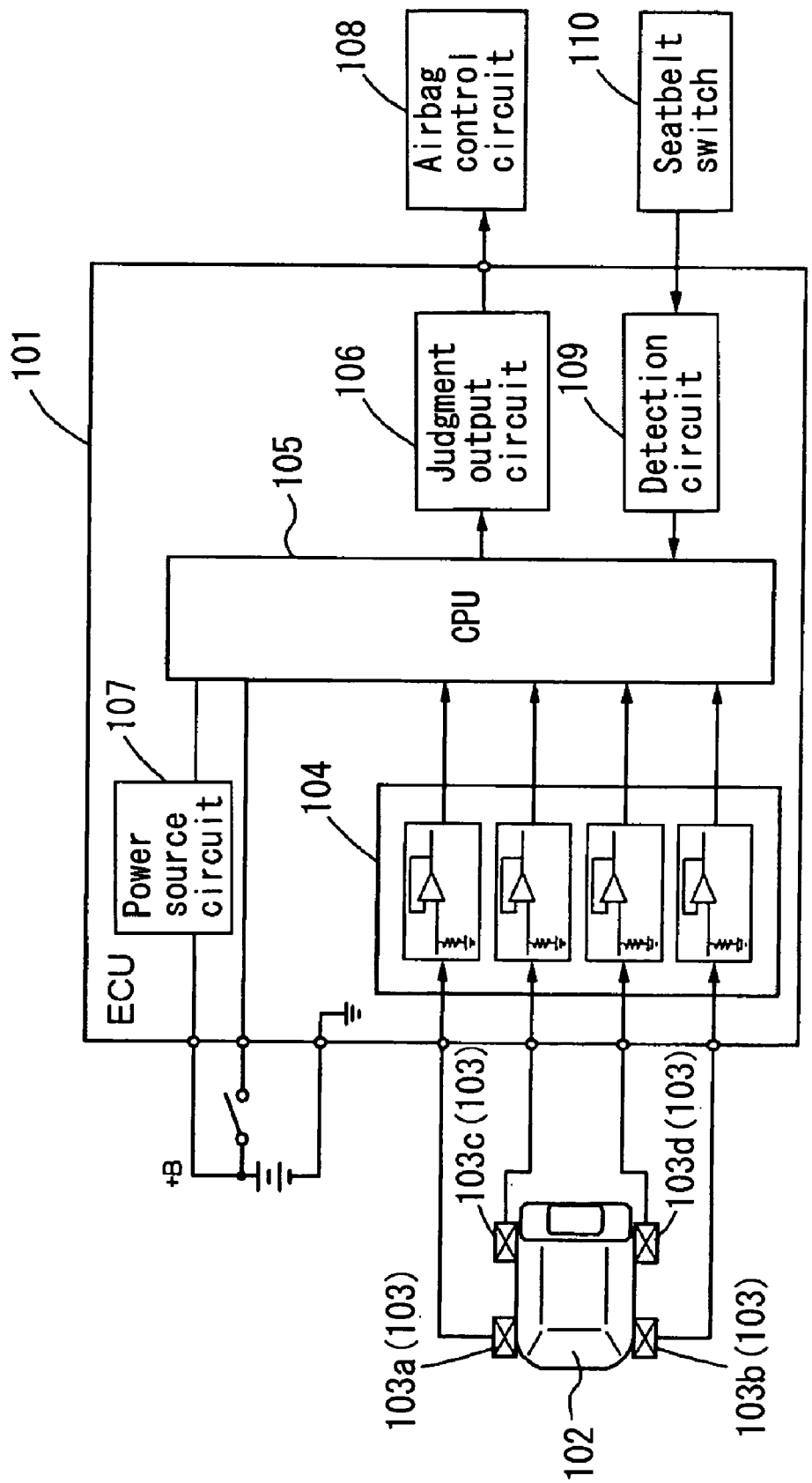
FIG. 5 is an occupant-classifying system and a structural view surrounding thereof according to a second embodiment of the present invention.

The judgment of a classification of an occupant by the CPU 5 will be explained with reference to FIGS. 2–4. FIG. 2 shows a flow illustrating a procedure for the judgment of a classification of an occupant. FIG. 3 shows the relationship between the judgment of a classification and a load fluctuation when a seat occupied state is changed from an unoccupied state to a child occupied state. FIG. 4 shows the relationship between the judgment of a classification and a load fluctuation when a seat occupied state is changed from a child occupied state to an adult occupied state.

As shown in FIG. 2, the CPU 5 obtains and adds up values of a load detected by means of the sensors 3a–3d on the basis of load data inputted from the sensor signal inputting circuit 4 at every predetermined time, and obtains the load of an occupant sitting on the seat 2 (Step #101). Thereafter, current classification of judgment, either an unoccupied state, a child occupied state, and an adult occupied state, is detected (Step #102).

In case the current classification is judged as an unoccupied state at Step #102, transaction proceeds to Step # 103. As shown in FIG. 3, when the load calculated at Step #101 is equal to or greater than threshold load value A, and the load calculated at Step #101, being equal to or greater than threshold load value A, continues equal to or longer than the first predetermined time duration T1, a seat occupied state is deemed to be an adult occupied state (Step #104). Further, a switching flag is set (Step #105). Because it is deemed that an occupant is occupying a seat when a seat occupied state is changed from an unoccupied state to another occupied state, and the occupant rarely adopts a posture that gives a superficial appearance of reduced weight, when the occupied state is changed from an unoccupied state to an adult occupied state there is a strong possibility that the occupant sitting on the seat 2 is an adult.

When the load calculated at Step #101 does not satisfy conditions that be equal to or greater than threshold load value A, and the load calculated at Step #101, equal to or greater than threshold load value A, continues equal to or longer than the first predetermined time duration T1, transaction proceeds to Step #106. When the load calculated at Step #101 is equal to or greater than threshold load value C, and less than threshold load value A, and a state where the load calculated at Step #101, equal to or greater than threshold load value C, and less than threshold load value A, continues equal to or longer than second predetermined time duration T2, a seat occupied state is deemed to be a child occupied state (Step #107). When the load calculated at Step #101 does not satisfy a condition that the load calculated at Step #101 being equal to or greater than threshold load value C and less than threshold load value A, and a state where the load calculated at Step #101 equal to or greater than threshold load value C, and less than threshold load value A, continues equal to or longer than second predetermined time duration T2, transaction proceeds to Step #120.

When the current classification is judged as a child occupied state at Step #102, the transaction proceeds to Step #108. As shown in FIG. 4, when the load calculated at Step #101 is equal to or greater than threshold load value C, and less than threshold load value A, and a state where the load calculated at Step #101, equal to or greater than threshold load value C, and less than threshold load value A, continues equal to or longer than first predetermined time duration T1, a seat occupied state is deemed to be an adult occupied state (Step #109). Further, the switching flag is cleared (Step #110). Because there are strong possibility that this judgment of an adult occupied state is erroneous judgment as a result of a child pushing the seat 2, by clearing the switching flag, it becomes easier for a seat occupied state to be changed from an adult occupied state to a child occupied state and it becomes easy to determine restoration of a judgment to a child occupied state.

When the load calculated at Step 101 does not satisfy conditions that the load calculated at Step #101 be equal to or greater than threshold load value C, and less than threshold load value A, and a state where the load calculated at Step #101 being equal to or greater than threshold load value C and less than threshold load value A continues equal to or longer than first predetermined time duration T1, transaction proceeds to Step #111. When the load calculated at Step #101 is less than threshold load value C, and a state where the load calculated at Step #101 is less than threshold load value C continues equal to or longer than the third predetermined time duration T3, a seat occupied state is deemed to be an unoccupied state (Step #112). When the load calculated at Step #101 does not satisfy conditions that the load calculated at Step #101 be less than threshold load value C, and a state where the load calculated at Step #101 is less than threshold load value C continues equal to or longer than third predetermined time duration T3, transaction proceeds to Step #120.

When the current classification is judged as an adult occupied state at Step #102, transaction proceeds to Step #113. When a switching flag is set at Step #113, transaction proceeds to Step #114. When the switching flag is set, a seat occupied state is judged on the basis of a threshold load value X and a predetermined time duration TX so that a seat occupied state is unlikely to be changed from an adult occupied state to a child occupied state. As shown in FIG. 3, at Step #114, when the load calculated at Step #101 is equal to or greater than threshold load value C, and less than third threshold load value X, and a state where the load calculated at Step #101 is equal to or greater than threshold load value C, and less than third threshold load value X, continues equal to or longer than the predetermined time duration TX, a seat occupied state is deemed to be a child occupied state (Step #115), and the switching flag is cleared (Step #116). When the load calculated at Step 101 does not satisfy conditions that the load calculated at Step #101 be equal to or greater than threshold load value C, and less than third threshold load value X, and a state where the load calculated at Step #101 is equal to or greater than threshold load value C, and less than third threshold load value X, continues equal to or longer than predetermined time duration TX, transaction proceeds to Step #118.

When the switching flag is cleared at Step #113, transaction proceeds to Step #117. When the switching flag is cleared, a seat occupied state is judged on the basis of a fourth threshold load value Y and a predetermined time duration TY so that a seat occupied state is likely to be changed from an adult occupied state to a child occupied state and judgment is easily restored. As shown in FIG. 4, at Step #117, when the load calculated at Step #101 is equal to or greater than threshold load value C, and less than fourth threshold load value Y, and a state where the load calculated at Step #101 is equal to or greater than threshold load value C and less than fourth threshold load value Y, continues equal to or longer than predetermined time duration TY, a seat occupied state is deemed to be a child occupied state (Step #115), and the switching flag is cleared (Step #116). When the load calculated at Step #101 does not satisfy conditions that the load calculated at Step #101 is equal to or greater than threshold load value C, and less than fourth threshold load value Y, and a state where the load calculated at Step #101 is equal to or greater than threshold load value C, and less than fourth threshold load value Y continues equal to or longer than predetermined time duration TY, transaction proceeds to Step #118.

At Step #118, when the load calculated at Step #101 is less than threshold load value C, and a state where the load calculated at Step #101 is less than threshold load value C, continues equal to or longer than the third predetermined time duration T3, a seat occupied state is deemed to be an unoccupied state (Step #119). When the load calculated at Step #101 does not satisfy conditions that the load calculated at Step #101 be less than threshold load value C, and a state where the load calculated at Step #101 is less than threshold load value C continues equal to or longer than the third predetermined time duration T3, transaction proceeds to Step #120. According to the first embodiment of the present invention, by repeating transactions of Steps #101–120 at every predetermined time the CPU 5 makes a judgment on the classification of an occupant on the basis of a seat occupied state.

The judgment output circuit 6 obtains judged result from the CPU 5 either when the CPU 5 judges the classification of an occupant or when a seat occupied state is changed. Further, the judged result is outputted to a device such as the airbag control circuit 8 which uses the judged result, on the basis of the states of the device.

The airbag control circuit 8 receives an output signal from the judgment output circuit 6, and controls deployment of the airbag on the basis of the judged result reviewed from the ECU 1. In addition to front airbags, side airbags and curtain airbags, or the like, may be provided at a vehicle, and the airbag control device 8 ensures safety by controlling the deployment of the airbag on the basis of the seat occupied states including an adult occupied state and a child occupied state, for example, by not conducting deployment of the side airbag in a case of a child occupied state at a time that the vehicle collides.

According to a construction of an occupant-classifying system according to the first embodiment of the present invention, the load imposed on a vehicle seat is detected by a sensor, and a seat occupied state, whether an unoccupied state at which an occupant does not occupy a seat or a seat occupied state at which an occupant does occupy a seat, is judged on the basis of an output from the sensor. The seat occupied state is classified into plural seat occupied states on the basis of predetermined threshold load values, and a judgment is made as to a seat occupied state when a load detected by the sensor corresponds to one of the plural seat occupied states and the particular seat occupied state continues for time durations predetermined for the particular seat occupied state. After the judgment, in order to prevent a given seat occupied state being changed to other seat occupied states or to an unoccupied state, the threshold load value determined between the particular seat occupied state and the other seat occupied state, and the time durations determined for other states are changed.

Generally, because it is unlikely that an occupant adopts a posture which gives a superficial appearance of reduced weight, the reliability of a judgment at a seat occupied state is high at a time that an occupant occupies a seat, that is, when a seat occupied state is changed from an unoccupied state to other states. Accordingly, by changing the threshold load value and time duration, in order to prevent the initially determined seat occupied state, at the time the occupant sits on the seat from being further changed to an unoccupied state, and to other seat occupied states, it becomes difficult that the seat occupied state to be changed from a highly reliable seat occupied state to other seat occupied states. As a result, reliability of the judgment can be further enhanced.

Further, because the threshold load value and time duration determined between the particular seat occupied state and other states on the basis of the initially determined seat occupied state at a time that an occupant sits on the seat, plural threshold load values and time durations can be determined even when a change is made from a particular seat occupied state to other seat occupied states. Thus, judgments can be made on the basis of a variety of posture changes of an occupant, and reliability of the judgment can be enhanced.

In order to use the judged result for controlling safety device, or the like, the safety device can be further appropriately controlled, and thus the safety of an occupant can be improved.

According to the construction of the first embodiment of the present invention, the plural seat occupied states include an adult occupied state and a child occupied state.

Generally, a safety device, such as an airbag, is controlled on the basis of whether an occupant is an adult or a child. Accordingly, by constructing an occupant-classifying system according to the first embodiment of the present invention in the foregoing manner, the occupant-classifying system can correspond to the safety device, or the like.

According to the construction of the first embodiment of the present invention, when a seat occupied state currently judged as an adult occupied state is changed to a judgment that the seat occupied state is at a child occupied state, a second predetermined threshold load value which is predetermined at a smaller level than a first threshold load value determined between an adult occupied state and an child occupied state and a predetermined time duration longer than a predetermined time duration determined for the child occupied state are determined.

In other words, according to the first embodiment of the present invention, a predetermined threshold load value and a predetermined time duration are re-determined so that a seat occupied state is unlikely to be changed from an adult occupied state to a child occupied state when the current seat occupied state is deemed to be an adult occupied state. Thus, for example, when an occupant who sits on a seat is an adult, it is unlikely to be judged that a seat occupied state is at a child occupied state even when the adult adopts a posture which gives a superficial appearance of reduced weight, and the load imposed on the seat is reduced. Accordingly, by constructing an occupant-classifying system in the foregoing manner, an erroneous judgment can be effectively prevented.

According to the construction of the first embodiment of the present invention, when a judgment is then further changed to the effect that a child is occupying a seat after a judgment that an occupant is a child is changed to a judgment that the occupant is an adult, a fourth predetermined threshold load value which is greater than the third predetermined threshold load value, and less than a first threshold load value determined between an adult occupied state and a child occupied state is determined. Thus, a predetermined time duration shorter than time duration determined for a child occupied state is determined.

For example, after a child occupies a seat, in a case where the child adopts a posture which concentrates a load at a particular point after sitting on the seat, a seat occupied state can on occasions be judged erroneously. Accidents involving personal injuries by means of airbags mainly occur when a child or an infant is the occupant. Because of this, deployment of airbags is controlled in varying ways depending on whether an occupant is an adult or a child in order to reduce accidents involving personal injuries to children and infants. Accordingly, when airbag control for an adult is performed on the basis of an erroneous judgment to the effect that an occupant is an adult even when a child is occupying a seat at a time of vehicle collision, the safety of the child occupying the seat is jeopardized.

According to the first embodiment of the present invention, threshold load value and time duration are re-determined so that a judgment is likely to be restored to a child occupied state after a seat occupied state is changed from a child occupied state to an adult occupied state. In this case, the fourth predetermined threshold load value is determined as higher value, that is, as a less value than the first threshold load value and greater than the second predetermined threshold load in order to easily restore judgment to a child occupied state. Accordingly, a seat occupied state is likely to be changed to a child occupied state and is easily restored to a child occupied state. With the construction of the first embodiment of the present invention, judgment can be easily restored even when the seat occupied state is erroneously judged.

Although a child occupied state and an adult occupied state are determined as a seat occupied state according to the first embodiment of the present invention, categories of seat occupied state are not limited. Appropriate numbers of seat occupied states are determined on the basis of states of a device based on judgment results of an occupant classification system such as a control for airbags, and appropriate threshold load value and time duration and predetermined threshold load and predetermined time duration are determined as a result of a determination of a seat occupied state.

Although, according to the first embodiment of the present invention, different threshold load value and predetermined threshold load are determined between a change from a child occupied state to an adult occupied state and from an adult occupied state to a child occupied state, in cases where additional numbers of seat occupied states are determined, different plural numbers of threshold load values and time durations may be determined when a seat occupied state is changed from an unoccupied state, or from one of plural occupied states to unoccupied state, or to any one of other plural seat occupied states. Further, only threshold load value may be determined. In order to prevent erroneous judgment and to easily restore judgment from the erroneous judgments, appropriate threshold load value and time duration, and predetermined threshold load and predetermined time duration are determined.

A second embodiment of the present invention will be explained with reference to FIGS. 5-8. An occupant classification system according to the second embodiment of the present invention is provided at an ECU (Electronic Control Unit) 101. The occupant classification system according to the second embodiment of the present invention is constructed to receive outputs from a sensor 103 provided at a seat 102 for vehicle and a seatbelt switch 110, and to output judgment result to an airbag control circuit 108. The sensor 103 is provided at least at four positions, at the right and the left of the front portion, and the right and the left of the rear portion of the seat 102 for outputting the load data in the form of electric voltage.

The ECU 101 includes a sensor signal inputting circuit 104, a detection circuit 109 serving as a state detection means of a buckled state of a seatbelt, a CPU (Central Processing Unit) 105, a judgment output circuit 106, and a power source circuit 107.

The sensor signal inputting circuit 104 is connected to the sensor 103 and the CPU 105, receives load data from the sensor 103 in the form of electric voltage, coverts an analog signal to a digital signal, and output the digital signal to the CPU 105. The sensor signal inputting circuit 104 is provided at each sensor 103. According to the second embodiment of the present invention, four sensor signal inputting circuits 104 are provided at sensors 3a–3d respectively.

The detection circuit 109 (serving as a state detection means) is connected to the seatbelt switch 110 and the CPU 105 for receiving a signal from the seatbelt switch 110, for detecting whether the seatbelt is in a buckled state or an unbuckled state, and for outputting the detected results to the CPU 105.

The CPU 105 receives the load data from the sensor signal inputting circuit 104, and judges whether a seat occupied state of the seat 102 is an unoccupied state at which an occupant is not sitting on the seat 2, or a seat occupied state at which an occupant is sitting on the seat 102. The seat occupied state is classified into plural seat occupied states on the basis of predetermined threshold load values, and a child occupied state at which a child is sitting on a seat and an adult occupied state at which an adult is sitting on a seat are established as seat occupied states according to the second embodiment of the present invention. Further, a switching flag for determining an unbuckled state and a buckled state of the seatbelt are established. The switching flag is cleared at the buckled state, and the switching flag is set at the unbuckled state.

Settings for threshold load values and time duration will be explained as follows.

A threshold load value A (i.e., a first threshold load value) is determined as a threshold load value when a seat occupied state is changed from an unoccupied state or a child occupied state to an adult occupied state. A threshold load value C (i.e., a second threshold load value) is determined as a threshold load value when a seat occupied state is changed from an unoccupied state to a child occupied state, and as a threshold load value when a seat occupied state is changed from an adult occupied state or a child occupied state to an unoccupied state. In this case, the threshold load value C corresponds to a prescribed maximum load for a child.

When a seat occupied state is changed from an adult occupied state to a child occupied state, predetermined threshold load is selected on the basis of states of the switching flag. When the switching flag is cleared, a predetermined threshold load value Y (i.e., a fourth threshold load value) which is smaller than a first threshold load value determined between an adult occupied state and a child occupied state is determined. When the switching flag is set, a predetermined threshold load value X (i.e., a third threshold load value) which is smaller than the predetermined threshold load value Y is determined. Thus, when the switching flag is set, that is at a buckled state of a seatbelt, a seat occupied state is changed from an adult occupied state to a child occupied state, and even when it is erroneously judged that an adult occupies a seat, a judgment of a seat occupied state is likely to be restored to a child occupied state, and implanting of the erroneous judgment is prevented. Further, when the switching flag is set, that is, at an unbuckled state of the seatbelt, a seat occupied state assumes unlikely to be changed from an adult occupied state to a child occupied state, and an erroneous judgment and frequent change of a seat occupied state is prevented. First predetermined time duration T1 is determined for switching to an adult occupied state, second predetermined time duration T2 is determined for switching to a child occupied state, and third predetermined time duration T3 is determined for switching to an unoccupied state.

Figure 6:
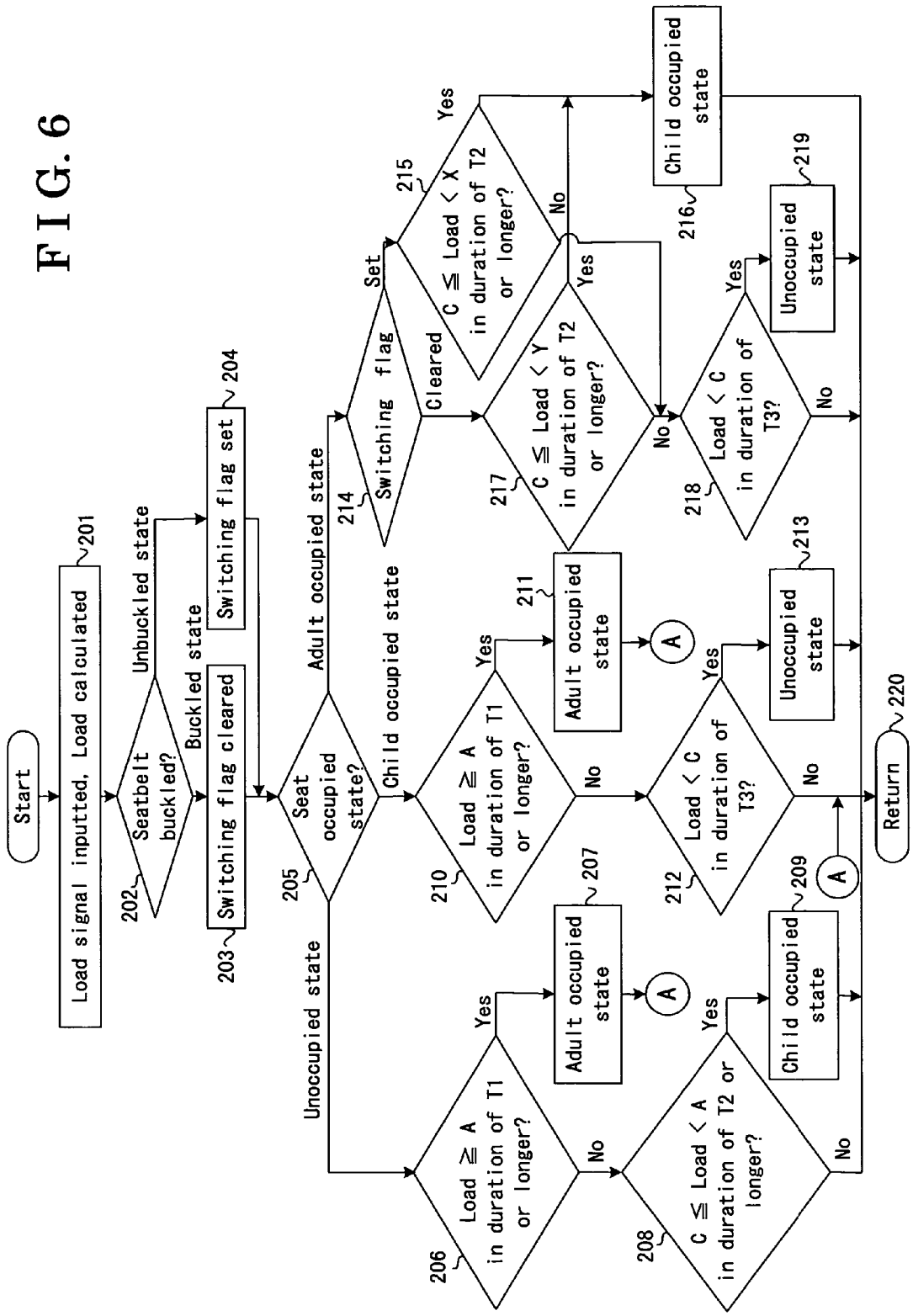
FIG. 6 is a view showing a flow of the occupant-classifying system according to the second embodiment of the present invention.
Figure 7:
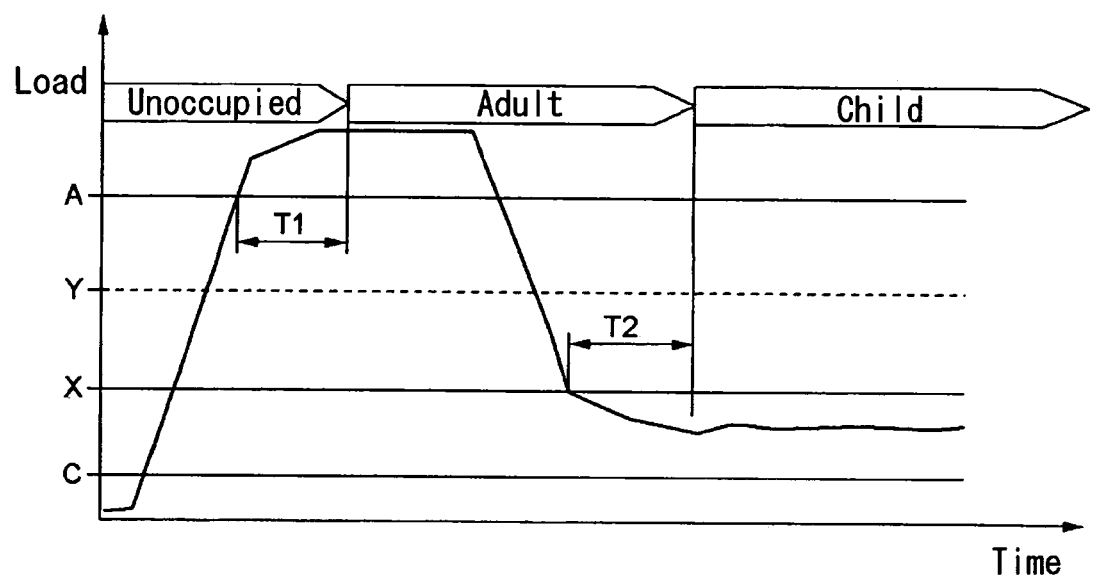
FIG. 7 is a view showing a relationship between a load fluctuation and a judgment of the occupant-classifying system according to the second embodiment of the present invention.
Figure 8:
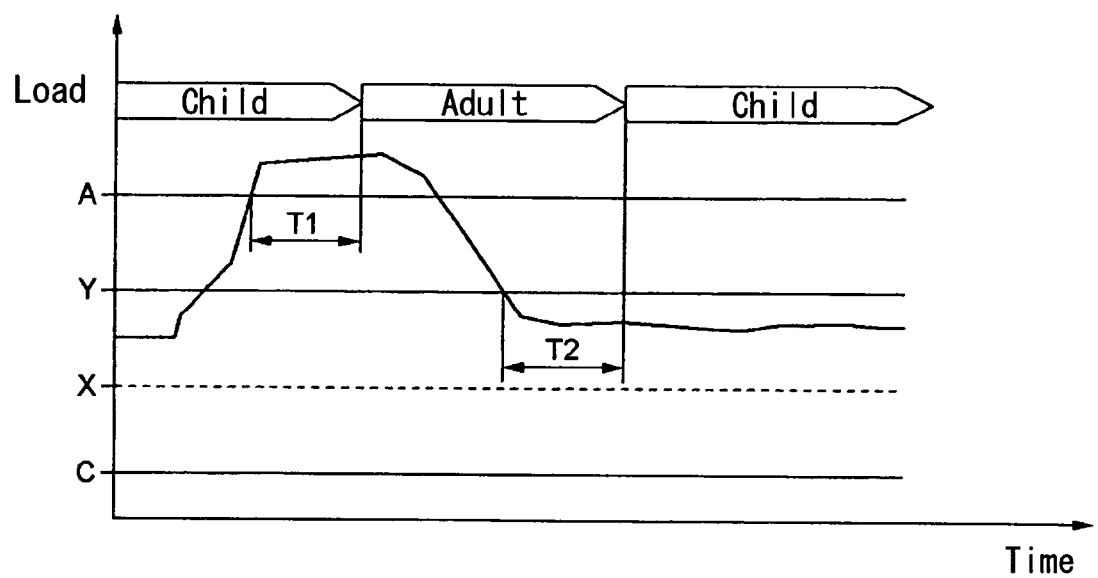
FIG. 8 is a view showing a relationship between a load fluctuation and a judgment of the occupant-classifying system according to the second embodiment of the present invention.

Judgment of categories of an occupant by means of the CPU 105 will be explained with reference to FIGS. 6–8. FIG. 6 shows a flow showing a procedure for judgment of an occupant. FIG. 7 shows a relationship between a judgment and a fluctuation of load when a seatbelt is buckled. FIG. 8 shows a relationship between a judgment and a fluctuation of load when a seatbelt is not buckled.

As shown in FIG. 6, the CPU 105 obtains a load of an occupant who is sitting on the seat 102 by obtaining and adding up the load detected by means of the sensors 103a–103d on the basis of load data inputted from the sensor signal inputting circuit 104 at every predetermined time (Step #201).

Next, the CPU 105 obtains information whether the seatbelt is buckled or unbuckled on the basis of the output signal of the detection circuit 109 (Step #202). At Step #202, when the seatbelt is not buckled, the switching flag is set (Step #204), and when the seatbelt is buckled, the switching flag is cleared (Step #203). After setting of the switching flag, transaction proceeds to Step #205.

At Step #205, when it is judged that a seat is currently unoccupied, transaction proceeds to Step #206. As shown in FIG. 7, when the load calculated at Step #201 is equal to or greater than the threshold load value A, and a state that the load calculated at Step #201 equal to or greater than threshold load value A continues equal to or longer than the first predetermined time duration T1, a seat occupied state is deemed to be an adult occupied state (Step #207). When conditions that load calculated at Step #201 is equal to or greater than the threshold load value A, and a state that the load calculated at Step #201 equal to or greater than threshold load value A continues equal to or longer than first predetermined time duration T1 are not satisfied, transaction proceeds to Step #208. At Step #208, when the load calculated at Step # 201 is equal to or greater than threshold load value C and a state that the load calculated at Step # 201 is equal to or greater than threshold load value C continues equal to or longer than second predetermined time duration T2, a seat occupied state is deemed to be a child occupied state (Step #209). When conditions that load calculated at Step # 201 is equal to or greater than threshold load value C and a state that the load calculated at Step # 201 is equal to or greater than threshold load value C continues equal to or longer than second predetermined time duration T2 are not satisfied, transaction proceeds to Step #220.

At Step #201, in case a seat occupied state is currently determined to be an adult occupied state, transaction proceeds to Step #214. At Step #214, when a switching flag is set, transaction proceeds to Step #215. In this case, when the switching flag is set, that is, when the seatbelt is unbuckled, a seat occupied state is judged on the basis of the third threshold load value X so that a seat occupied state is unlikely to be changed from an adult occupied state to a child occupied state. At Step #215, as shown in FIG. 7, a seat occupied state is deemed to be a child occupied state when the load calculated at Step #201 is equal to or greater than the threshold load value C and less than the third threshold load value X, and a state that load calculated at Step #201 is equal to or greater than the threshold load value C and less than the third threshold load value X continues for equal to or longer than the second predetermined time duration T2 (Step #216). When conditions that load calculated at Step #201 is equal to or greater than the threshold load value C and less than the third threshold load value X, and a state that load calculated at Step #201 is equal to or greater than the threshold load value C and less than the third threshold load value X continues for equal to or longer than the second predetermined time duration T2 are not satisfied, transaction proceeds to Step #218.

At Step #214, when a switching flag is cleared, transaction proceeds to Step #217. When the switching flag is cleared, that is, when a seatbelt is buckled, a seat occupied state is judged on the basis of the fourth threshold load value Y so that a seat occupied state is likely to be changed from an adult occupied state to a child occupied state. At Step #217, as shown in FIG. 8, when a load calculated at Step #201 is equal to or greater than the threshold load value C and less than the fourth threshold load value Y, and a state that load cal acted at Step #201 is equal to or greater than the threshold load value C and less than the fourth threshold load value Y continues for equal to or longer than second predetermined time duration T2, a seat occupied state is deemed to be a child occupied state (Step #216). When conditions that load calculated at Step #201 is equal to or greater than threshold load value C and less than fourth threshold load value Y, and a state that load calculated at Step #201 is equal to or greater than threshold load value C and less than the fourth threshold load value Y continues for equal to or longer than second predetermined time duration T2 are not satisfied, transaction proceeds to Step #218.

At Step #218, when the load calculated at Step #201 is less than threshold load value C and a state that the load calculated at Step #201 is less than threshold load value C continues for equal to or longer than third predetermined time duration T3, a seat occupied state is deemed to be an unoccupied state (Step #219). When conditions the load calculated at Step #201 is less than threshold load value C and a state that the load calculated at Step #201 is less than threshold load value C continues for equal to or longer than the third predetermined time duration T3 are not satisfied, transaction proceeds to Step #220. The CPU 105 according to the second embodiment of the present invention judges a seat occupied state of an occupant by repeating Steps #201–220 at every predetermined time.

The judgment output circuit 106 obtains judgment result from the CPU 105 either when the CPU 105 judges a seat occupied state or when a seat occupied state is changed. Thereafter, the judged result is outputted to a device, which uses the judged result, such as the airbag control circuit 108 as the need arises.

The airbag control circuit 108 receives an output signal from the judgment output circuit 106, and controls deployment of the airbag on the basis of judged result from the ECU 101. In addition to front airbags, side airbags and curtain airbags, or the like, may be provided at a vehicle, and the airbag control device 108 ensures safety by controlling the deployment of the airbag on the basis of seat occupied states including an adult occupied state and a child occupied state, for example, by not conducting deployment of the side airbag at a child occupied state at a time that the vehicle collides.

With the occupant-classifying system according to the second embodiment of the present invention, a load imposed on the vehicle seat is detected by means of the sensor, and whether a seat occupied state is an occupied state at which an occupant is sitting on the seat or an unoccupied state at which an occupant is not sitting on the seat is judged from output from the sensor. The seat occupied state is classified into plural seat occupied states on the basis of predetermined threshold load values. The occupant-classifying system includes the state detection means for detecting whether the seatbelt is buckled or unbuckled when a seat occupied state is deemed to be an occupied state when a load of the sensor corresponds to one of the plural seat occupied states and the given state continues for a predetermined time duration for the seat occupied state. Further, the occupant-classifying system changes at least one of the threshold load value and time duration on the basis of a state of the seatbelt.

In other words, according to the second embodiment of the present invention, because at least one of threshold load value and time duration are determined on the basis of the state of the seatbelt, judgment can comply with changes of posture of an occupant and its frequency at both unbuckled state and buckled state of the seatbelt, and thus the reliability for the judgment can be further enhanced.

Further, in cases where the judged result is used for controlling safety devices, or the like, can be appropriately controlled, and thus safety of an occupant can be enhanced.

According to the second embodiment of the present invention, the plural seat occupied states include an adult occupied state and a child occupied state. The safety device such as the airbag is controlled on the basis of whether an occupant is an adult or a child. Thus, with the construction of the occupant-classifying system according to the second embodiment of the present invention, the occupant-classifying system can comply with the safety devices.

According to the second embodiment of the present invention, the current classification of a judgment that an adult occupies a seat is changed to a judgment that a child occupies a seat when the seatbelt is buckled, at least one of the followings are performed, which are, determining the fourth predetermined threshold load value, which is less than the second threshold load value determined between an adult occupied state and a child occupied state, and determining the first predetermined time duration, which is longer than the time duration determined for the child occupied state.

In other words, according to the second embodiment of the present invention, a seat occupied state is easily changed from an adult occupied state to a child occupied state when the seatbelt is buckled at which the fluctuation of the load is relatively small level and changes of the posture is less frequent. Accordingly, even when the seat occupied state is erroneously judged, implanting of the erroneous judgment can be prevented, and the judgment can be easily restored.

According to the second embodiment of the present invention, when the current judgment that a seat occupied state is at an adult occupied state is changed to a judgment that a seat occupied state is at a child occupied state when the seatbelt is not buckled, at least one of the followings are conducted, which are, determining the third predetermined threshold load, which is less than the fourth predetermined threshold load, and determining the second predetermined time duration, which is longer than the first predetermined time duration. In other words, with the construction of the occupant-classifying system according to the second embodiment of the present invention, the adult occupied state is difficult to be changed to a child occupied state when the seatbelt is not buckled, that is, when the fluctuation of the load is relatively large and changes of the posture is frequent. Accordingly, with the construction of the occupant-classifying system according to the second embodiment of the present invention, erroneous judgment because of the change of the posture with large fluctuation of load and frequent change of judgments can be prevented, which further enhances reliability of a judgment.

Although the third and fourth threshold load values are determined relative to the first and second threshold load values in order to comply with the buckled state and the unbuckled state, according to the second embodiment of the present invention, the third and fourth threshold load values may be determined relative to the predetermined time durations. In this case, when the switching flag is cleared, that is when a seatbelt is buckled, shorter predetermined time duration is determined, and when the switching flag is set, that is when the seatbelt is unbuckled, longer predetermined time duration is determined. Although a seat occupied state includes a child occupied state and an adult occupied state according to the second embodiment of the present invention, variations of the seat occupied state is not limited. Appropriate numbers of seat occupied states for a state of a device such as an airbag which uses the judgment result may be determined, and appropriate first and second threshold load values and corresponding predetermined time durations and third and fourth threshold load values and corresponding predetermined time durations.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An occupant-classifying system, comprising:
    a load-detecting means assembled at a vehicle seat for detecting a load value imposed on the vehicle seat and for outputting the load value; and
    a controller for determining whether the vehicle seat is in an occupied state, or in an unoccupied state on a basis of the load value outputted from the load-detecting means; wherein
    a seat occupied state is classified into plural modes defined on a basis of plural threshold load values;
    the controller is configured to determine the seat occupied state when the load value falls within a specific mode among the plural modes and lasts for a predetermined time duration defined for each specific mode; and wherein
    the controller changes one of the threshold load values which define a boundary between the selected mode and another, neighboring mode, whether occupied mode or unoccupied mode.

2. The occupant classifying system according to claim 1, wherein one of the threshold load values which define a boundary of the selected mode and another, neighboring mode, and the predetermined time duration defined for said another neighboring mode are changed in order to prevent another mode being selected or to prevent an unoccupied state being established.

3. The occupant classifying system according to claim 2, wherein the plural modes of the seat occupied state include an adult occupied state at which an adult occupies the vehicle seat and a child occupied state at which a child occupies the vehicle seat.

4. The occupant classifying system according to claim 3, wherein
    the plural threshold load values include a first state change load value; and wherein the first state change load value less than one of the threshold load values defined between the adult occupied state and the child occupied state is defined and a time duration longer than one of the time duration defined for the child occupied state is defined when a current judgment that the mode of the seat occupied state is the adult occupied state is changed to a judgment that the mode of the seat occupied state is the child occupied state.

5. The occupant classifying system according to claim 4, wherein
    the plural threshold load values include a second state change load value greater than the first state change load value and less than the threshold value defined between the adult occupied state and the child occupied state; and wherein
    the second state change load value greater than the first state change load value and less than the threshold value defined between the adult occupied state and the child occupied state is defined and a time duration shorter than the time duration defined for the child occupied state is defined when a judgment that an occupant is a child is changed to a judgment that the occupant is an adult, and is further changed to a judgment that a child is occupying the vehicle seat.

6. The occupant classifying system according to claim 1 further comprising a detecting means for detecting whether or not a seatbelt is buckled, wherein, depending on whether or not the seatbelt is buckled, a change is made to at least one of the threshold load values which define a boundary of the selected mode and the time duration for the selected mode.

7. The occupant classifying system according to claim 6, wherein the plural modes of seat occupied state includes an adult occupied state at which an adult occupies the vehicle seat and a child occupied state at which a child occupies the vehicle seat.

8. The occupant classifying system according to claim 7, wherein at least one of determining a first state change load value smaller level than one of the threshold load values defined between the adult occupied state and the child occupied state, and determining a first state change time longer than the time duration defined for the child occupied state when the seatbelt is buckled and a current judgment that an adult occupies the vehicle seat is changed to a judgment that a child occupies the vehicle seat.

9. The occupant classifying system according to claim 8, wherein at least one of determining a second state change load value smaller level than the first state change load value and determining a second state change time longer than the first state change time when the seatbelt is unbuckled and a current judgment that an adult occupies the vehicle seat is changed to a judgment that a child occupies the vehicle seat.

* * * * *